Figure 1:
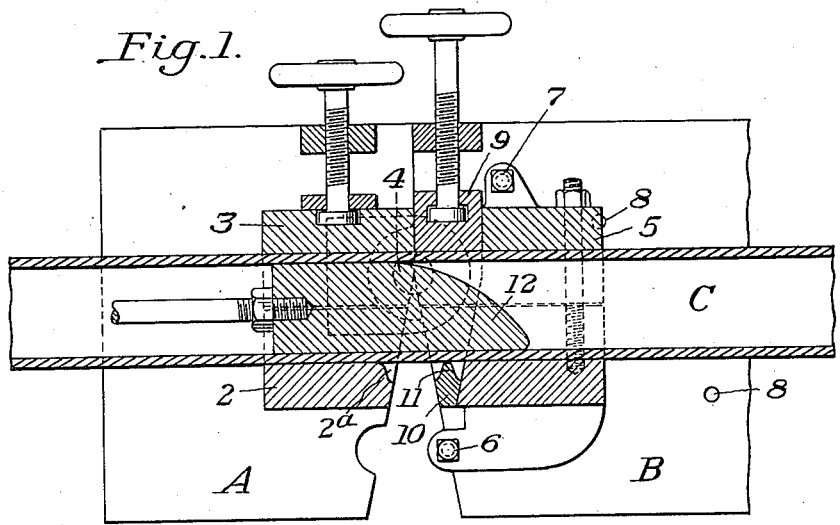

Oct. 20, 1936. W. N. QUARTZ ET AL 2,057,916
THICK WALLED METAL PIPE
Original Filed Oct. 31, 1931

INVENTORS
William N. Quartz
William J. Bannen
by their attorneys

Patented Oct. 20, 1936

2,057,916

UNITED STATES PATENT OFFICE 2,057,916

THICK WALLED METAL PIPE

William N. Quartz, Pittsburgh, and William J. Bannen, Oakmont, Pa., assignors to Power Piping Company, Pittsburgh, Pa., a corporation of Pennsylvania Original application October 31, 1931, Serial No. 572,338, now Patent No. 1,958,447, dated May 15, 1934. Divided and this application May 12, 1934, Serial No. 725,386

2 Claims. (Cl. 285—211)

This invention relates to thick walled metal pipe as distinguished from sheet metal stove pipe and the like, and more particularly to thick walled pipe having a bend therein. The present application constitutes a division of our copending application Serial No. 572,338, filed October 31, 1931, now issued as Patent No. 1,958,447, dated May 15, 1934.

When a piece of pipe is bent, the metal beyond the center of the pipe at the outside of the bend is put under tension while the metal between the center of the pipe and center of curvature is put under compression. Consequently, if a piece of pipe is merely heated at the point where the bend is to be made, and then curved to the desired degree of curvature, the metal around the outside of the bend is stretched and weakened, and the metal on the inside is distorted. The pipe then tends to flatten out, and the sharper the bend the greater is the distortion.

Pipe bends have heretofore been made by forming creases or bulges on the inside of the bend at spaced intervals. By forming such creases or bulges, an excess length of metal can be formed into the inside of the bend, the excess length of metal thus taken up in the bulges being sufficient to relieve the outside of the curve from any substantial straining or stretching. That is to say, that instead of stretching the outside of the bend, an excess length of pipe is used sufficient to prevent stretching at the outside, and the excess length at the inside of the bend is formed into spaced creases or bulges.

As heretofore constructed, the metal thickness in the walls of these corrugated or bulged portions has remained about the same as the thickness of the original pipe, and the excess length of metal has been taken up entirely by the bulge. According to the present invention, the bend comprises a plurality of creases formed on the inside of the curve, but the metal constituting the creased portions is also upset so that the wall thickness in the corrugations or creases is considerably more than the original thickness of the pipe. By reason of this fact, a greater length of the original pipe is concentrated in the resulting crease or corrugation. Fewer corrugations are necessary, or, if the number of corrugations is not decreased, the height of the corrugations or bulges is decreased. The corrugations or creases can, therefore, be closer together, which means that the bend can be made about a shorter radius.

Pipe bends of this kind are commonly used in high pressure steam lines. In the forming of the bulges or corrugations, the original grain structure of the metal is considerably distorted, and there is a definite physical advantage in increasing the wall thickness of the pipe at these points, as well as the advantages resulting from reducing the radius and enabling the bend to be made more sharply and in a smaller space. It should also be noted that where these bulges are formed on the inside of the bend, the interior of the pipe has transverse pockets or grooves inside the bulges. By the present invention through the reduction in the wall thickness of the metal in the creases, the volume of these pockets, both in depth and width, is more reduced and in the mid plane of the pipe, may be substantially eliminated.

Figure 2:
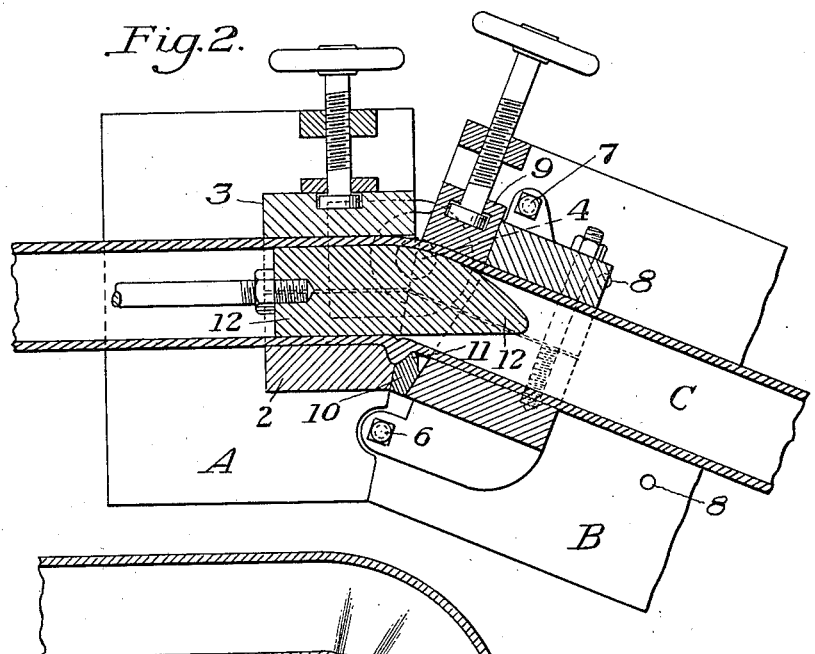
Figure 3:
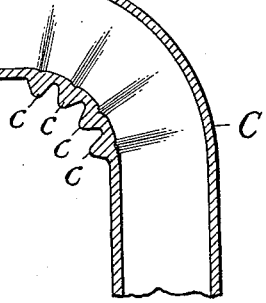

The invention may be readily understood by reference to the accompanying drawing, in which Figure 1 shows the first step in the method of forming the pipe bend, wherein the pipe is shown as being straight and as being supported in the bending apparatus, a part only of which is shown;

Figure 2 is a view similar to Figure 1, showing the first step in the making of the bend; and Figure 3 is a longitudinal section through the completed pipe bend.

The apparatus disclosed is more fully and completely shown and described in our said copending application Serial No. 572,338, now issued as Patent No. 1,958,447 dated May 15, 1934 and is illustrated only to give a more complete understanding of the nature of the resulting bend.

The nature of the pipe bend may perhaps best be understood by describing the method according to which it is made. According to this method, the piece of pipe which is to be bent is supported as shown in Figure 1 intermediate its ends in the pipe bending machine. The pipe bending portion of this machine comprises essentially two main parts A and B. The length of pipe to be bent is designated C. The supporting member A is provided with a pipe clamp 2 having a movable jaw 3. The pipe supporting and engaging member B is pivotally secured to the member A at each side of the pipe, the pivoting support connecting the two parts A and B being shown at 4. The transverse axis about which the member B moves with respect to the member A, i. e., the center of the pivot 4, is above the longitudinal axis of the pipe C and near the top of the pipe. The member B carries a pipe clamp 5 which is pivotally secured to the structure B at 6 and which is adjustably secured to the structure B by means of removable bolts 7 which cooperate with regularly spaced holes 8. The member B supports another pipe clamping unit having an adjustable upper jaw 9 and a lower jaw 10, the lower jaw being provided with a tooth-like projection 11 for engaging the part of the pipe which is to form the inside of the bend.

It will be noted that the supports A and B and the adjacent pipe clamping units carried thereby are in abutting relation above the axis of the pivot 4 and that they are beveled below the axis of the pivot 4, leaving a substantial wedge-shaped opening between the two members A and B, exposing the part of the pipe in which the bend is to be formed. This unsupported portion of the pipe between the two clamps is, in the process of making the bend, heated to a relatively high temperature, as explained in our said copending application, after which the member B is moved in an arc about the pivotal support 4 to the position shown in Figure 2. In moving through this arc, the heated wedge-shaped part of the pipe which is unsupported between the two clamps is compressed and squeezes together at the same time into the space provided between the tooth 11 on the pipe clamp 10 and the cut-away portion 2a of the clamp member 2. A considerable length of the pipe along the inside wall of the bend is thus compressed into a very small space, and the pipe is strengthened by the very great increase in the thickness of the metal over the normal wall thickness of the pipe where this crease is formed. The creasing and the upsetting, of course, are most extensive in the median vertical plane of the pipe, and from this point the corrugations are of gradually decreasing depth and wall thickness around toward the sides of the pipe, the corrugation vanishing at or just below the axis of the pivot 4.

The bending is preferably done over a mandrel 12 as shown, in order to prevent any collapse of the pipe. Since the bending is effected by forcing the wedge-shaped length of pipe into the form of corrugation described, there is very little stretching of the metal on the outside of the pipe bend, so that for this reason the pipe bend is also quite strong.

After forming the first crease or corrugation as shown in Figure 2, the clamps 3 and 9 are loosened and the pipe is moved forwardly so that the crease or corrugation so formed will lie on the opposite side of the tooth 11 of the lower clamp member 10. The bolt 7 which holds the adjustable clamp 5 in position is then removed, and the movable member B is raised back to the position shown in Figure 1. When it has been brought back to the position shown in Figure 1, the bolt 7 will register with the second hole 8, and the bolt 7 will be passed through this hole 8 to again hold the member 8 against movement relative to the member B. It will be observed, however, that in this second position the clamp 5 will have been adjusted about its pivot 6 through an arc corresponding to the distance which the first stage of bending has effected. The operation of creasing and upsetting is then repeated to form the second crease or corrugation, all as more fully described in our said copending application. This cycle of operation is repeated until the pipe has been bent to the desired turn and the necessary number of creases has been formed.

In Figure 3, the pipe C is shown as being turned sharply at substantially a right angle. There are four corrugations or creases of the character described, wherein the wall thickness of the metal is increased through the upsetting of the metal and wherein the corrugations are substantially solid in the median plane of the pipe. The corrugations, which are marked c are closely adjacent one another rather than being spaced any distance apart. This close positioning of the corrugations or ribs enables the bend to be made sharply and with a minimum length of pipe.

The pipe bend being formed from thick walled pipe is adapted for use in high pressure steam lines and other fluid conveying lines, and is especially desirable where the fluid is carried at a considerable pressure or where the pipe has to make a bend through a very sharp angle. The pipe bend is characterized by the increased metal thickness in the ribs, the relatively slight transverse valleys on the inside of the pipe, and the fact that the ribs are close together and are formed by the upsetting of the metal in addition to some creasing or corrugating action. Moreover, the pipe bend is formed in such manner that the metal at the outside of the bend has been stretched to a negligible extent.

We claim:

1. A pipe having a bend therein, the part of the pipe forming the inside of the curve being forged, the forged portion having a substantially smooth inner surface at the mid plane of the pipe and transverse ribs having a solid thickness of metal greater than the thickness of the wall of the pipe, said ribs being of decreasing thickness from the mid plane of the pipe at the inside of the bend around the sides thereof.

2. A pipe having a bend therein, the part of the pipe forming the inside of the curve being forged, the forged portion having a substantially smooth inner surface at the mid plane of the pipe and transverse ribs having a solid thickness of metal greater than the thickness of the wall of the pipe, said ribs being of decreasing thickness from the mid plane of the pipe at the inside of the bend around the sides thereof, the ribs being positioned immediately adjacent one another.

WILLIAM N. QUARTZ.
WILLIAM J. BANNEN.